Aug. 24, 1937.                P. MATTIA                2,091,210
CHANGE SPEED MECHANISM
Original Filed March 7, 1934          2 Sheets-Sheet 1

Inventor.
Pietro Mattia

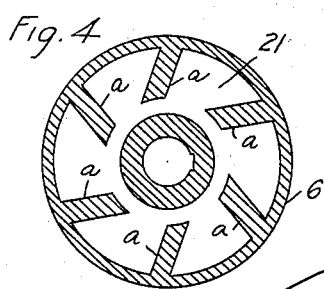
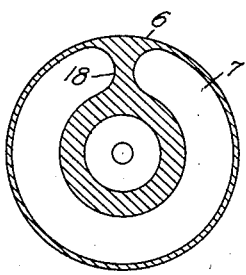
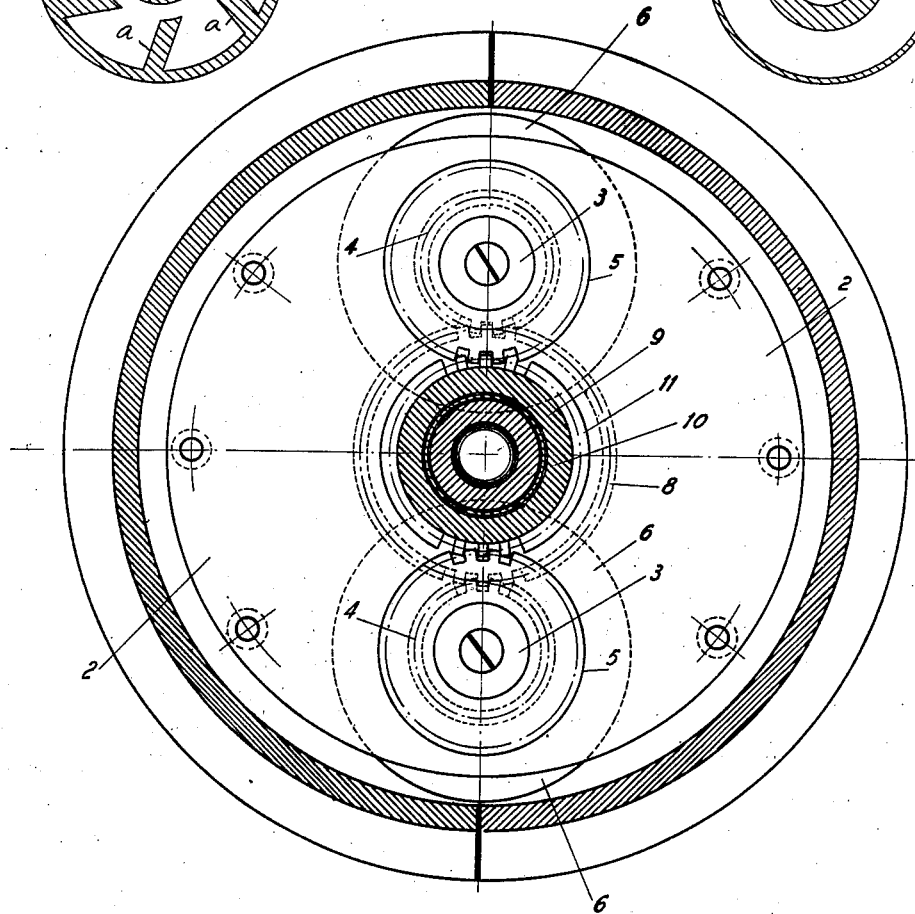
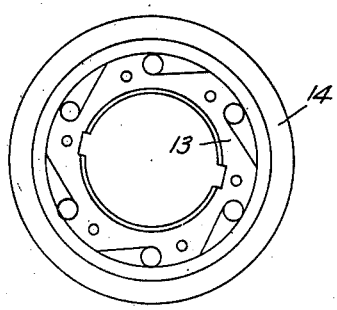

Patented Aug. 24, 1937

2,091,210

UNITED STATES PATENT OFFICE 2,091,210

CHANGE SPEED MECHANISM

Pietro Mattia, Milan, Italy

Application March 7, 1934, Serial No. 714,484
Renewed February 25, 1937. In Italy July 29, 1933

2 Claims. (Cl. 74—260)

The invention concerns one of those gears or mechanisms which are known as change speed gears as are generally used with motor cars, but which may be used for power transmission in general.

One object of the invention is to improve the known epicyclic gear train.

A further object of the invention is to provide a mechanism adapted to change the speed ratio automatically changed over a driven shaft, when a determined change of the load takes place.

A further object of the invention is to clutch the driven shaft automatically to the power shaft as soon as the latter reaches a certain load or speed.

Another object of the invention is to connect in serial a plurality of improved epicyclic gear trains to obtain a variety of torques over the driven shaft.

Another object of the invention is to provide means whereby the centrifugal force developed in a drum subjected to a planetary rotation, may be utilized to counteract the rotation of said drum on its own axis.

A further object of the invention is to provide an epicyclic gear train having a spur wheel capable of rotating in one direction only to the effect of allowing a loose rotation of the train in said same direction when the driving shaft is directly clutched to the driven shaft.

With these and other objects in view, the invention will now be described with reference to the annexed drawings in which:—

Fig. 2 is a section on line 2—2 of Fig. 1.

Fig. 3 is a cross-section of a drum connected to the mechanism.

Fig. 4 is the cross-section of a second form of construction of said drum.

Fig. 5 is a side view of a free-wheel mechanism embodied in the invention.

Figure 1:
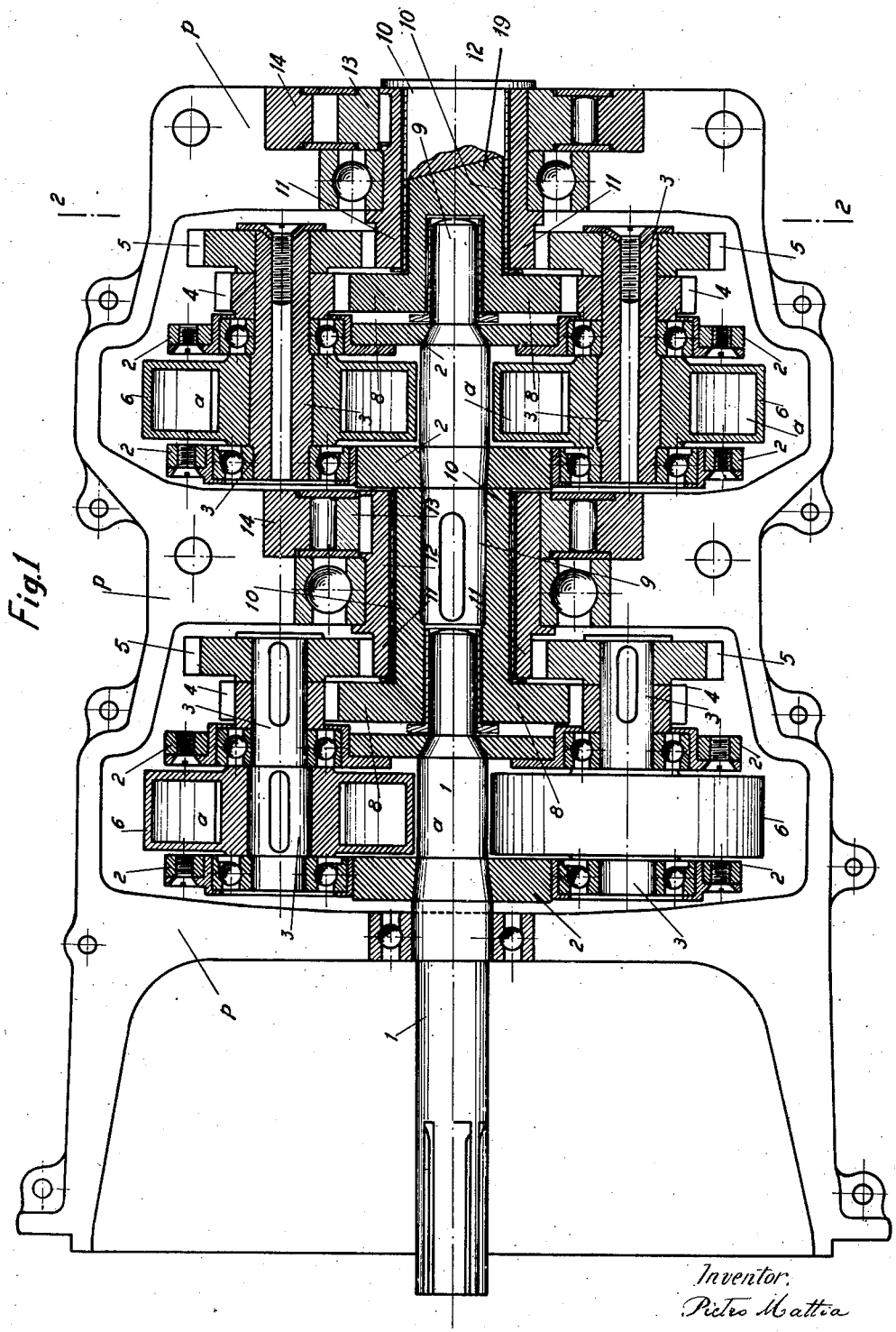
Fig. 1 is a sectional view of a mechanism designed according to the invention.

As shown in Fig. 1, two identical mechanisms are illustrated, mounted one after the other.

With two mechanisms three different torque are provided for the driven shaft.

The power shaft 1 is provided with a bar carrier 2 which bears rotatably a plurality of axles 3 (two axles are shown in the drawings) having a symmetrical arrangement in respect of the power shaft.

To each axle 3 is fastened a spur wheel 4, a spur wheel 5 and a drum 6. The wheel 5 meshes with a free wheel 11 coaxial to the power shaft and which, through a one way brake mechanism (Fig. 5) 13, 14 has a connection to a dependent part $p$ of the stationary housing of the gear in order to allow said one way brake to rotate freely in the driving direction of the power shaft while being prevented to rotate in the opposite direction.

A secondary shaft 9 mounted in alignment with the power shaft 1 is rotatably connected thereto by means of the hub of the wheel 8, 10, both shafts 1 and 9 bearing as a unit on the walls $p$ of the housing.

The spur wheel 4 meshes with a spur wheel 8 fastened to the secondary shaft 9. The drum 6 (Figs. 3, 4) has an annular cavity 7 (21 in Fig. 4) which may be discontinued totally at a certain point by means of a wall 18 (Fig. 3) or may be partially discontinued at various points (Fig. 4) by means of radial vanes $a$ which project from the periphery of the cavity 21 with a certain inclination in respect of the radius of the drum. In the latter described form of construction of the drum, the cavity 21 is continuous in the vicinity of the hub.

In the said drum, hermetically closed, there is lodged a certain amount of a high density fluid, preferably mercury, to the effect hereafter described.

I have described one mechanism, but in the drawings a further one is illustrated which is connected to the secondary shaft 9 in the same way as the first mechanism is connected to the power shaft 1. Therefore the second mechanism needs no further description, it being implicit that the further wheels 4, 5, 11, 8 have the already mentioned interconnections and that, in this second mechanism, the shaft 9 may be considered as a power shaft, there being a driven shaft 19 mounted in alignment thereto.

The compound gear acts as follows:—

If we imagine the described gear applied to a motor car it may be considered that at the start of the car, a considerable resistance is offered to the movement, therefore a considerable torque will be necessary to the driven shaft 19 to set the car in motion.

It is therefore desirable that the speed may be transmitted from the power shaft 1 to the driven shaft 19 through a low speed ratio.

By starting the engine, the power shaft carries in rotation the double disc carriers 2. Said carriers carry in revolution about their own axis, the wheels 4 and 5 (planetary wheels) and the drum 6.

Said wheels 4 and 5 by meshing with the wheels 8 and 11 get their reaction. The reaction of wheel 8 is derived from the resistance of the machine (load), the reaction of wheel 11 deriving from its impossibility to revolve in one direction. Both reactions combined have the dynamic effect of driving the axles 3 with the wheels 4 and 5 pinned thereto, while the wheels 4 drive the wheel 8 pinned to the secondary shaft 9.

We have thus a transmission of power from shaft 1 to shaft 9 at a certain rate of speed (differential speed) and with correspondent increase of the torque, which may be calculated according to known function given by any manual of kinematics in connection with the so called epicyclic gear train.

The secondary shaft 9 on its turn carries in rotation its own double disc carrier 2 which carries in revolution the second set of axles 3 with the respective wheels 4 and 5 and the drum 6, said wheels 4 and 5 meshing respectively with corresponding wheels 8 and 11 which react in the already described manner, to set in rotary motion the wheels 4 and 5 and to drive the further shaft 19 through wheel 8 of said second mechanism, at a rate of speed further reduced.

With such reduced speed there is of course a corresponding increase of the torque acting on shaft 9 which causes the motion of the car.

The car being in motion it does not need the high torque employed to start. The lower load causes an increase in the speed of the engine, while of course the shaft 1 revolves at higher speed than the shaft 9. The speed of the shaft 1 which carries in rotation with the double disc member 2 the drum 6, may be high enough to develop a considerable amount of centrifugal force in the mercury contained in the cavity of the drum 6. Said force, bearing on the wall 7 or on one of the vanes a counteracts the rotation of the drum on its own axle 3 and balances the resistance offered by wheel 8. In such conditions the rotation of the wheels 4 and 5 is blocked with the rotation of the axles 3 and we have a rigid clutch of said wheels with the wheels 11 and 8.

The wheel 8 is thus driven in direct connection with the power shaft 1. In said direct driving, the wheel 11 being driven in the sense of its freedom, revolves loosely on its own axis.

If the car encounters a resistance (up hill, brakeage) we return to the initial conditions of high load, the drum 6 decreases its speed, the direct clutch disappears with the decrease of the centrifugal force, and both mechanisms retake their function of decreasing the rate of speed at the driven shaft, and increasing the torque correspondingly. A direct coupling of the three shafts 1, 9, 19, is obtained when by suitable carburation, the shafts 1 and 9 run with high enough speed in relation to the load.

Having now fully described the nature of my invention and the manner in which the same should be performed I declare that what I claim is:—

1. In a change speed mechanism comprising a driving shaft and a driven shaft, a carrier fastened to said driving shaft and a toothed wheel keyed to said driven shaft, couples of planet wheels of different diameters keyed on axes symmetrically arranged on said carrier and parallel to said shafts, the smaller of said wheels meshing with the toothed wheel on said driven shaft, said mechanism being contained in a stationary housing, a central spur wheel mounted on said housing concentric with said shafts and provided with a one-way brake made of ratchet and rollers to allow rotation of said spur wheel in the rotating direction of the driving shaft only, said spur wheel meshing with the larger planet wheels; a drum keyed on the axis of each planet couple, said drum having an annular cavity partially discontinued at various points by means of radial vanes which project from the periphery of said cavity with a certain inclination in respect of the radius of the drum, said cavity containing mercury.

2. A mechanism of the character described comprising, in combination, a driving shaft and a driven shaft, a carrier fastened to said driving shaft and a toothed wheel secured to said driven shaft, couples of planet wheels of different diameter rigidly operatively connected together and mounted on said carrier and arranged on axes parallel to said shafts, the smaller of said wheels meshing with the toothed wheel on said driven shaft, said mechanism being contained in a stationary housing, a central spur wheel mounted on said housing concentric with said shafts and provided with a one-way brake to allow rotation of said spur wheel in only the direction of rotation of the driving shaft, said spur wheel meshing with the larger planet wheels, and a drum rigidly operatively connected with each planet couple, said drum having an annular cavity partially discontinued at various points by means of vanes projecting from the periphery of said cavity at an angle with respect to the radii of the drum, said cavity containing a heavy fluid.

PIETRO MATTIA.